(12) United States Patent
Lintz et al.

(10) Patent No.: US 11,007,935 B2
(45) Date of Patent: May 18, 2021

(54) VEHICLE IMAGING SYSTEM (71) Applicant: Gentex Corporation, Zeeland, MI (US)

(72) Inventors: Joshua D. Lintz, Allendale, MI (US); Bradley A. Bosma, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/202,501

(22) Filed: Nov. 28, 2018

(65) Prior Publication Data
US 2019/0168669 A1 Jun. 6, 2019

Related U.S. Application Data (60) Provisional application No. 62/744,345, filed on Oct. 11, 2018, provisional application No. 62/593,690, filed on Dec. 1, 2017.

(51) Int. Cl.
B60R 1/00 (2006.01)
G06F 3/14 (2006.01)
(Continued)

(52) U.S. Cl.
CPC .............. B60R 1/00 (2013.01); B60R 1/12 (2013.01); B60R 11/0217 (2013.01);
(Continued)

(58) Field of Classification Search
CPC ......... B60R 1/00; B60R 1/12; B60R 11/0217; B60R 11/0235; B60R 11/0247;
(Continued)

(56) References Cited

U.S. PATENT DOCUMENTS

2002/0044065 A1* 4/2002 Quist ................. B60R 1/12
340/815.4
2010/0201816 A1* 8/2010 Lee .................... B60R 1/12
348/148
(Continued)

FOREIGN PATENT DOCUMENTS

WO 2000015462 A1 3/2000

OTHER PUBLICATIONS

International Search Report dated Mar. 11, 2019, in corresponding International Application No. PCT/US2018/062742, 3 pages.

Primary Examiner — Thai Q Tran
Assistant Examiner — Nienru Yang
(74) Attorney, Agent, or Firm — Price Heneveld LLP; Bradley D. Johnson (57) ABSTRACT A system for a vehicle may comprise a rearview assembly comprising a display element configured for providing a rearward view of a scene behind the vehicle, at least one imaging device in communication with the display element and configured to capture images from within a passenger compartment of the vehicle, and a printed circuit board in communication with the display element and the at least one imaging device. The display element may be configured to selectively display content received from a source external to the vehicle. The display element may be suitable for receiving inputs from a plurality of sources. At least one of the plurality of sources may be one of the internet and a cellular network.

16 Claims, 5 Drawing Sheets (51) Int. Cl.

| | |
|---|---|
| *H04N 5/33* | (2006.01) |
| *B60R 11/02* | (2006.01) |
| *B60R 1/12* | (2006.01) |
| *B60R 11/04* | (2006.01) |
| *H04N 7/18* | (2006.01) |
| *G06F 3/147* | (2006.01) |
| *G06F 3/041* | (2006.01) |
| *B60R 11/00* | (2006.01) |

(52) U.S. Cl.
CPC ...... *B60R 11/0235* (2013.01); *B60R 11/0247* (2013.01); *B60R 11/04* (2013.01); *G06F 3/14* (2013.01); *G06F 3/147* (2013.01); *G06F 3/1423* (2013.01); *H04N 5/33* (2013.01); *H04N 7/181* (2013.01); *B60R 2001/1215* (2013.01); *B60R 2001/1253* (2013.01); *B60R 2001/1261* (2013.01); *B60R 2001/1276* (2013.01); *B60R 2011/0033* (2013.01); *B60R 2300/207* (2013.01); *B60R 2300/8006* (2013.01); *B60R 2300/8066* (2013.01); *G06F 3/041* (2013.01); *G09G 2370/16* (2013.01)

(58) Field of Classification Search
CPC ............. B60R 11/04; B60R 2001/1215; B60R 2001/1253; B60R 2001/1261; B60R 2001/1276; B60R 2011/0033; B60R 2300/8006; B60R 2300/8066; G06F 3/14; G06F 3/041; H04N 5/33; H04N 7/181
USPC ......................................................... 348/148
See application file for complete search history.

(56) References Cited

U.S. PATENT DOCUMENTS

| | | | | |
|---|---|---|---|---|
| 2012/0182242 | A1* | 7/2012 | Lindahl | B60R 1/12 |
| | | | | 345/173 |
| 2013/0090785 | A1* | 4/2013 | Baratono | B60R 1/12 |
| | | | | 701/2 |
| 2015/0054933 | A1* | 2/2015 | Wasiek | B60R 1/12 |
| | | | | 348/77 |
| 2015/0085127 | A1* | 3/2015 | Kramer | B60K 35/00 |
| | | | | 348/148 |
| 2016/0119527 | A1* | 4/2016 | Shahid | H04N 5/33 |
| | | | | 348/148 |

* cited by examiner

VEHICLE IMAGING SYSTEM

FIELD OF THE INVENTION

The present disclosure relates generally to video systems integrated into vehicles, and more particularly to video systems having a field of view of at least a portion of the interior of a vehicle.

BACKGROUND

Cameras and imaging devices are increasingly being employed for various functions in motor vehicles. Some of the imaging systems are to be used in the interior of a vehicle. Some imaging systems may be used, for example, to collect images of vehicle occupants.

Due to space and configuration restrictions, it may be difficult to have an unobtrusive imaging system with high quality video in the interior of a vehicle. The imaging systems may be difficult to disguise, and may be considered aesthetically displeasing.

In some instances, the imaging systems may be disposed within a rearview assembly, and may be within the housing of the rearview assembly. However, as manufacturers include more devices within the housing of the rearview assembly, it may become difficult to find sufficient room within the housing for all the components without making the housing so large that it impairs driver visibility and becomes aesthetically displeasing. Furthermore, due to lighting conditions in the interior of the vehicle, the imaging systems may produce images that appear over or under-exposed.

SUMMARY

According to an embodiment, a system for a vehicle may comprise a rearview assembly comprising a display element configured for selectively providing a rearward view of a scene behind the vehicle, at least one imaging device in communication with the display element and configured to capture images from within a passenger compartment of the vehicle, and a printed circuit board in communication with the display element and the at least one imaging device. The display element may be configured to selectively display content received from a source external to the vehicle. The display element may be suitable for receiving inputs from a plurality of sources. At least one of the plurality of sources may be one of the internet and a cellular network.

The system further may comprise at least one microphone disposed within a housing of the rearview assembly and in communication with the printed circuit board. The system further may comprise at least one speaker disposed within a housing of the rearview assembly and in communication with the printed circuit board. The system further may comprise at least one antenna in communication with the printed circuit board and configured to be in selective communication with one of a cellular telephone network and the Internet.

The system further may comprise a subscriber identification module ("SIM card"), wherein a housing of the rearview assembly defines a slot for a SIM card. The SIM card may be configured to be in communication with the at least one antenna. The system further may comprise at least one capacitive touch sensor in communication with the printed circuit board and disposed on a surface of the display element. The display element may be capable of displaying images received from different sources in different sections of the display element. At least one of the inputs may be received from one of the Internet and a cellular network. The system further may comprise an electro-optic device disposed so that the display element may be viewed through the electro-optic device.

According to another embodiment, an assembly for a vehicle may comprise a rearview assembly configured to selectively provide a rearward view of a scene behind the vehicle and may comprise a display element, a printed circuit board in communication with the display element, and an antenna configured to communicate with at least one of the internet and a cellular network. The display element may be configured to selectively display content received from at least one of a plurality of different sources. At least one of the different sources may be external to the vehicle. The display element may be configured to selectively display content from a plurality of sources. The content from each of the plurality of sources may be displayed in a different section of the display element. The rearview assembly further may comprise at least one imaging device. The at least one imaging device may be configured to capture images from within a passenger compartment of the vehicle.

The rearview assembly further may comprise at least one microphone in communication with the printed circuit board. The at least one microphone may be configured to capture audio from within the vehicle. The rearview assembly further may comprise at least one speaker in communication with the printed circuit board. The rearview assembly further may comprise at least one antenna in communication with the printed circuit board. The antenna may be in selective communication with one of a cellular telephone network and the internet.

The rearview assembly further may comprise a SIM card, wherein the housing defines a slot for a SIM card. The SIM card may be disposed in the slot defined by the housing. The SIM card may be in communication with the at least one antenna. The display element may be configured to receive inputs from a plurality of sources. The display element may be capable of displaying the inputs from each of the plurality of sources in different sections of the display element.

According to another embodiment, a dual-purpose imaging system may comprise an imaging device comprising a lens, an image sensor in optical communication with the lens and configured to selectively capture images using one of visible and infrared or near-infrared light, a processor in communication with the image sensor, a first filter, and at least one IR emitter. The first filter may be configured to selectively reduce or eliminate light having wavelengths within a first range of wavelengths from reaching the image sensor. The at least one IR emitter may be configured to selectively emit at least one of infrared and near-infrared light in the direction of the field of view of the lens. The dual-purpose imaging system further may comprise a second filter. The second filter may be configured to selectively reduce or eliminate light having wavelengths within a second range of wavelengths from reaching the image sensor. The dual-purpose imaging system further may comprise a visible light source configured to selectively emit visible light in the direction of the field of view of the lens.

According to another embodiment, a rearview assembly for a vehicle comprises a rearview device for providing a rearward view of a scene behind the vehicle. A display element may be disposed within a housing of the rearview assembly. The display element may be configured to selectively display content received from a source external to the vehicle. The display element may be a liquid crystal display. The rearview assembly further may comprise at least one camera or imaging device. The at least one imaging device may be disposed within the housing and behind the display element.

The rearview assembly may further comprise at least one microphone which may be disposed within the housing. The rearview assembly may further comprise at least one speaker which may be disposed within the housing. The rearview assembly may further comprise at least one antenna. The at least one antenna may be in communication with the display element, and may be in selective communication with a cellular telephone network. Alternatively, the rearview assembly may further comprise at least one antenna in selective communication with the internet. The rearview assembly may further comprise at least one capacitive touch sensor disposed on a surface of the display element. The housing may define a slot for a SIM card, and the SIM card may be in communication with one of a cellular telephone network or the internet. The display element may receive inputs from a plurality of sources, and the display element may display the inputs in different sections of the display element.

According to another embodiment, a rearview assembly for a vehicle may comprise a rearview device for providing a rearward view of a scene behind the vehicle; and a display element in communication with the rearview device. The display element may selectively display content received from a plurality of different sources. At least one of the different sources may be external to the vehicle. The displayed content may be displayed in different sections of the display element. The display element may be a liquid crystal display.

The rearview assembly may further comprise at least one camera or imaging device. The at least one imaging device may be disposed behind the display element. The at least one imaging device may be configured to capture images from within a passenger compartment of the vehicle. The rearview assembly may further comprise at least one microphone; and the at least one microphone may be disposed within a housing of the rearview assembly. The rearview assembly may further comprise at least one speaker; and the at least one speaker may be disposed within the housing of the rearview assembly. The rearview assembly may further comprise at least one antenna. The at least one antenna may be in communication with the display element, and may be in selective communication with one of a cellular telephone network and the internet. The rearview assembly may further comprise a SIM card. A housing of the rearview assembly may define a slot for a SIM card. The SIM card may be disposed in the slot defined by the housing, and the SIM card may be in communication with the at least one antenna. The rearview assembly may further comprise at least one capacitive touch sensor disposed on a surface of the display element. The display element may receive inputs from a plurality of sources; and the display element may display the inputs in different sections of the display element.

According to another embodiment, a dual-purpose imaging system may comprise an imaging device comprising a lens; an image sensor in optical communication with the lens and configured to capture images selectively using both visible and infrared or near-infrared light; and a processor having memory and in communication with the image sensor; a first filter; and at least one IR emitter; wherein the first filter may be configured to selectively reduce or eliminate light having wavelengths within a first range of wavelengths from reaching the image sensor. The at least one IR emitter may be configured to selectively emit at least one of infrared and near-infrared light in the direction of the field of view of the lens. The dual-purpose imaging system may further comprise a second filter. The second filter may be configured to selectively reduce or eliminate light having wavelengths within a second range of wavelengths from reaching the image sensor. The dual-purpose imaging system may further comprise an additional light source; and the additional light source may comprise visible light.

DETAILED DESCRIPTION

The present disclosure pertains to an imaging system for vehicles. The imaging system may be configured to capture images of at least one person in the interior of the vehicle. In some embodiments, the imaging system may be incorporated into a rearview assembly.

In some embodiments, the imaging system may incorporate some or all of the components of a communication system for use in vehicles. The communication system may include audio communications, video communications, or both audio and video communications. Certain aspects or components of the communication system may be implemented in a rear-view assembly, a headliner or visor of the vehicle, the A-pillar, a door panel, a headrest, an overhead console, a vehicle dashboard or instrument panel, etc. With respect to those implementations, the discussion below relating to rearview assemblies is provided for purposes of example without otherwise limiting the scope of the disclosure to such rearview assemblies.

As used herein, a "rearview assembly" is a structure that may selectively provide an image of a scene to the rear of a driver. Such rearview assemblies may include an electrochromic or electro-optic rearview assembly. Rearview assembly may alternatively include a simple prismatic mirror. Rearview assembly may additionally or alternatively include an electronic display that displays an image as sensed by a rearward facing camera or other imaging device (see, for example, commonly assigned U.S. Pat. No. 6,550, 949 entitled "SYSTEMS AND COMPONENTS FOR ENHANCING REAR VISION FROM A VEHICLE," filed on Sep. 15, 1998, by Frederick T. Bauer et al., the entire disclosure of which is incorporated herein by reference). Thus, a rearview assembly need not include a mirror element. Additionally or alternatively, rearview assembly may include both an electrochromic or electro-optic rearview assembly and a display device for providing an image from a rearward facing camera or other imaging device.

Figure 1:
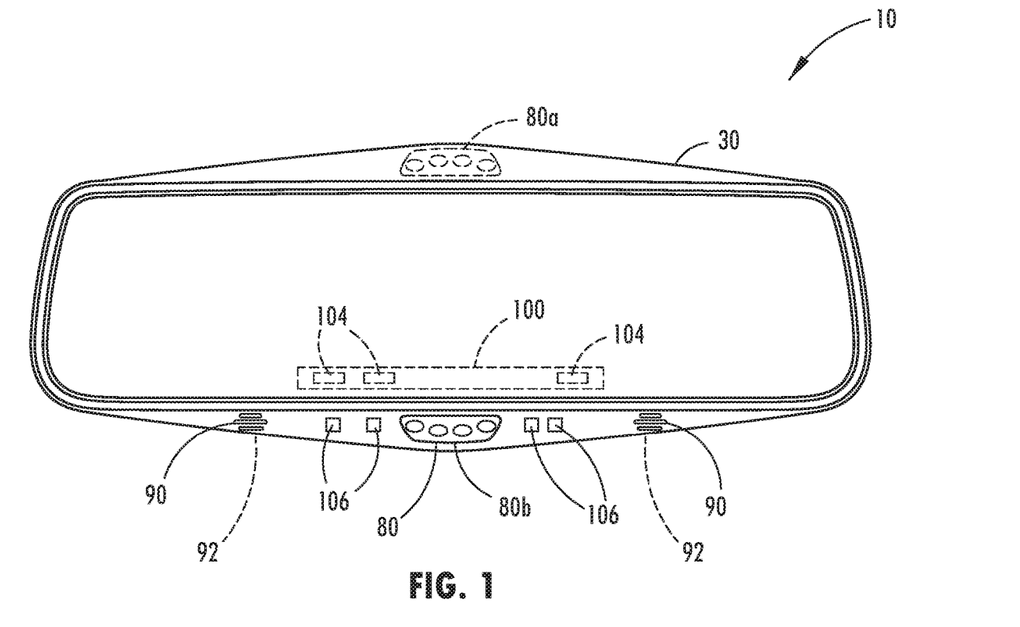
FIG. 1 illustrates a front view of a rearview assembly in accordance with a first embodiment of this disclosure.

An example of a rearview assembly constructed in accordance with an embodiment of the present disclosure is shown in FIG. 1. The rearview assembly 10 may be designed for mounting directly to the vehicle windshield. Alternatively, rearview assembly 10 may be designed for mounting to the inside roof of the vehicle. As will become apparent to one skilled in the art from the description of the various functions below, the vehicle communication system embodied in the rearview assembly 10 may include various combinations of the elements identified below, and thus need not include each and every element shown and described. Further, although each of the elements may be housed within rearview assembly 10, some or all of the components may be provided in other remote locations and may transmit and receive information over a vehicle bus or via transmissions.

In general, rearview assemblies include a housing 30 that may have a wide variety of possible designs, such as, for example, the mirror housing taught and claimed in U.S. Pat. No. 5,448,397. Rearview assemblies may also include at least one of a rearview device 40 and a video display element 45, both of which may be mounted in housing 30, and a mounting element 35 that attaches housing 30 to the vehicle. The various components described below may be mounted in housing 30 of rearview assembly 10 or may be mounted in mounting element 35, with appropriate electrical connections made therebetween.

Figure 2:
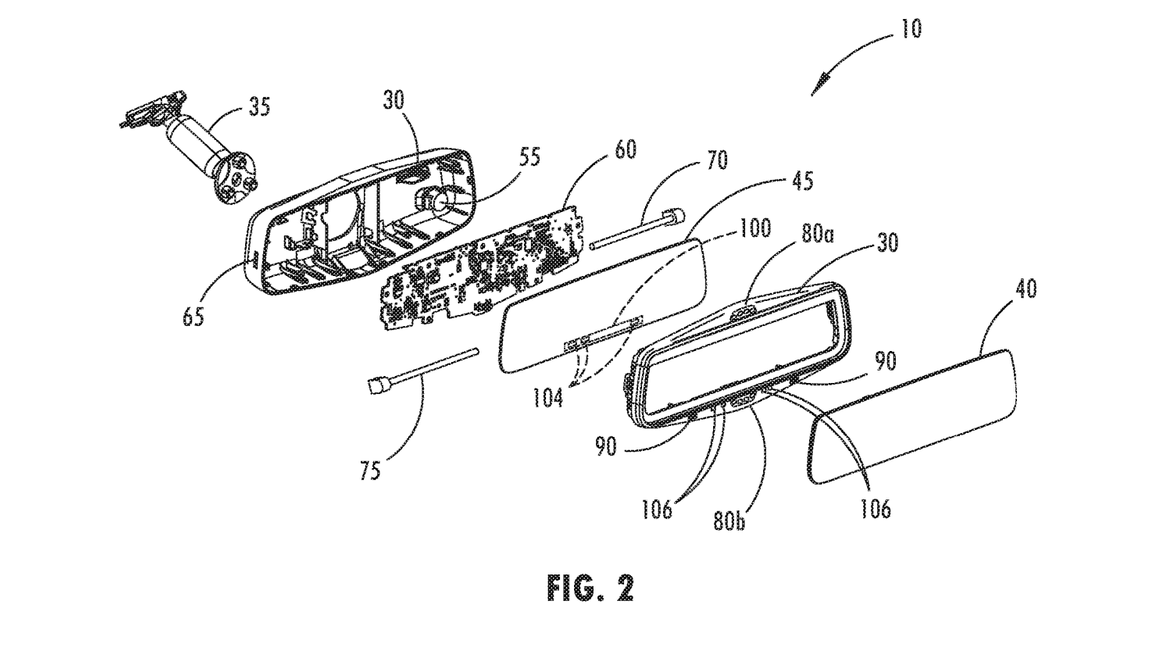
FIG. 2 illustrates an exploded view of the rearview assembly of FIG. 1.

FIG. 2 shows an exemplary mechanical construction of housing 30 of rearview assembly 10. As illustrated, the following components are mounted in or on housing 30; an optional rearview device 40; a display element 45; a printed circuit board 60; a first RF antenna 70; and an optional second antenna 75. Antennas 70, 75 may be in communication with display element 45, and may be in selective communication with one of a cellular telephone network and the Internet. At least one microphone 80 may be included. In some embodiments, microphone 80 may be mounted to the rear, bottom and/or top of housing 30, or within the housing behind the display element 45. In one embodiment, a first microphone 80a may be mounted to the top of housing 30 and a second microphone 80b may be mounted to the bottom of housing 30. The rearview assembly may also include at least one speaker 92.

Figure 3:
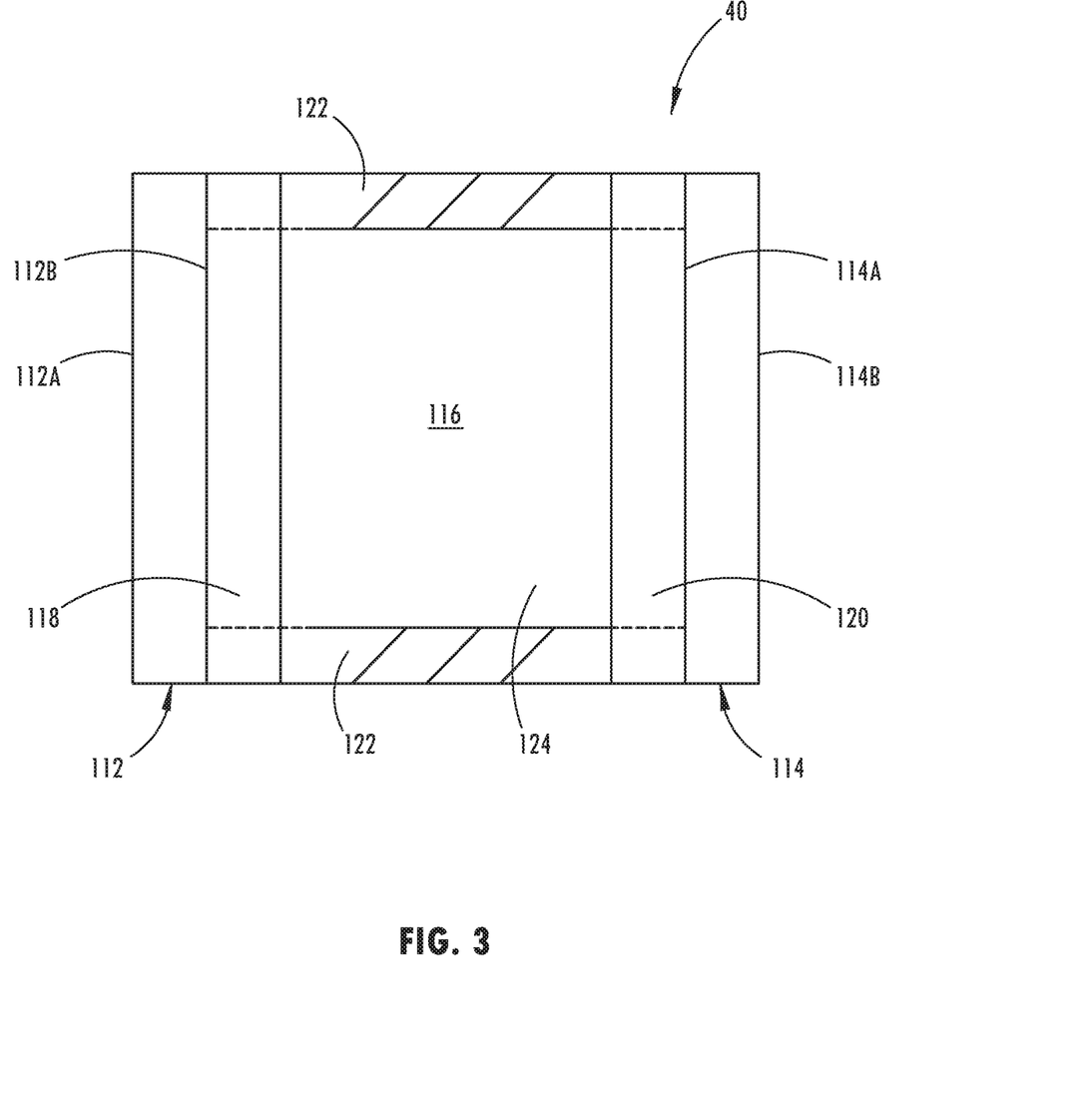
FIG. 3 illustrates a cross-sectional schematic representation of an electro-optic, device as used in the rearview assembly of FIG. 1.

In some embodiments, optional rearview device 40 of rearview assembly 10 may comprise a partially reflective, partially transmissive element such as an electrochromic or electro-optic mirror. FIG. 3 shows a cross-sectional schematic representation of an embodiment of an electro-optic device 40, which generally comprises first substrate 112 having front surface 112A and rear surface 112B, second substrate 114 having front surface 114A and rear surface 114B, and a chamber 116 for containing an electro-optic medium 124.

One or more layers of electrically conductive material or electrode coatings 118 may be associated with rear surface 112B of first substrate 112. These layers may serve as an electrode for electro-optic device 40. Electrically conductive material 118 may be a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within electro-optic device 40 or the atmosphere; and (e) exhibits minimal diffusion or specular reflectance as well as sufficient electrical conductance. Electrically conductive material 118 may be fabricated from fluorine doped tin oxide (FTO), indium/tin oxide (ITO), doped zinc oxide or other materials known to those having ordinary skill in the art.

Similarly, one or more layers of electrically conductive material 120 may be associated with front surface 114A of second substrate 114, and may be operatively bonded to electrically conductive material 118 by sealing member 122. As can be seen in FIG. 3, once bonded, sealing member 122 and the juxtaposed portions of electrically conductive materials 118 and 120 serve to define an inner peripheral geometry of chamber 116.

Rearview device 40 may be disposed in housing 10 in front of display element, thereby allowing display element 45 to be viewable through the partially reflective, partially transmissive element when the display element is activated.

Video display element 45 may include a display screen for the electronic display of images which may be transmitted from one or more cameras or other imaging devices 55. Video display element 45 may be selectively activated. In some embodiments, video display element 45 may be activated upon receipt of images from at least one of the one or more cameras or other imaging devices. In some embodiments, video display element 45 may be activated upon receipt of a user input activating video display element 45. Display element 45 may comprise a liquid crystal display.

In some embodiments, rearview assembly 10 may further include at least one camera or other imaging device 55. In some embodiments, the camera or other imaging device 55 may be disposed behind the partially reflective, partially transmissive element. In some embodiments, camera or other imaging device 55 may be disposed above, below, or to the side of the rearview device 40, either within the housing or mounted to the exterior of housing 30. In some embodiments, camera or other imaging device 55 may be disposed in or on one of the dashboard, the installment panel, the headliner, an overhead console, the mirror mount, or the A-pillar and in communication with rearview assembly 10.

In some embodiments, rearview assembly 10 may further include at least one microphone 80. In some embodiments, microphone 80 may be mounted in the rearview assembly. In some embodiments, a plurality of microphones 80 may be installed; for example, one microphone 80a may be disposed at the top of housing 30 and one microphone 80b may be disposed at the bottom of the housing, with the housing extending around the microphones, as shown in FIG. 1. In some embodiments, microphone 80 may be incorporated in or attached to the headliner, overhead console, visor, A-pillar seats, door panels, steering wheel, console, instrument panel of the vehicle, or any other suitable location, and communicatively coupled to the components in the rearview assembly by a wired or wireless signal.

In some embodiments, rearview assembly 10 may also comprise one or a plurality of speakers 92. In some embodiments, speakers 92 may be disposed in housing 30 or on exterior of housing. In some embodiments, housing 30 may define at least one and preferably a plurality of holes 90 in front of the at least one speaker 92, to allow clearer transmission of the sound from the at least one speaker 92. Depending on the orientation of the speaker 92 within housing, holes 90 may appear on the front, side, top, bottom, or rear surface of housing 30, In some embodiments, speakers 92 may be located elsewhere in vehicle, for example, in a door panel or a headrest. Speakers 92 may need to be disposed at least some distance from microphone(s) 80 to prevent overloading and/or feedback.

In some embodiments, the rearview assembly 10 may be in communication with and utilize the vehicle's speakers. Received audio signals may be played back through the vehicle audio system or through speakers 92 associated with rearview assembly 10. In some embodiments, audio signals may be transmitted via a dedicated connection to the vehicle audio system so as to cause the audio system to interrupt any radio broadcast or other music or programming playing over the audio system. Additionally, the microphone 80, speaker 92, and/or camera or other imaging device 55 of cellular telephone 95 may be disabled with those functions being performed by the microphone 80, speaker 92, and imaging device within the vehicle. In some embodiments, the remainder of the call processing and call transmission is handled by rearview assembly 10. In some embodiments, the remainder of the call processing and call transmission is handled by cell phone 95. The rearview assembly may send a signal to the car's radio/CD audio system to reduce the volume or mute the radio/CD audio system when the rearview assembly communication system is in use.

In some embodiments, an image displayed on rearview device may originate from a single source or imaging device 55. For example, display element 45 may display an image from a rearward facing imaging device or an image of a participant in a phone conversation that may originate from an imaging device associated with the phone on which the participant is speaking. In these examples, the display may cover the entire surface of the display element 45.

Figure 4:
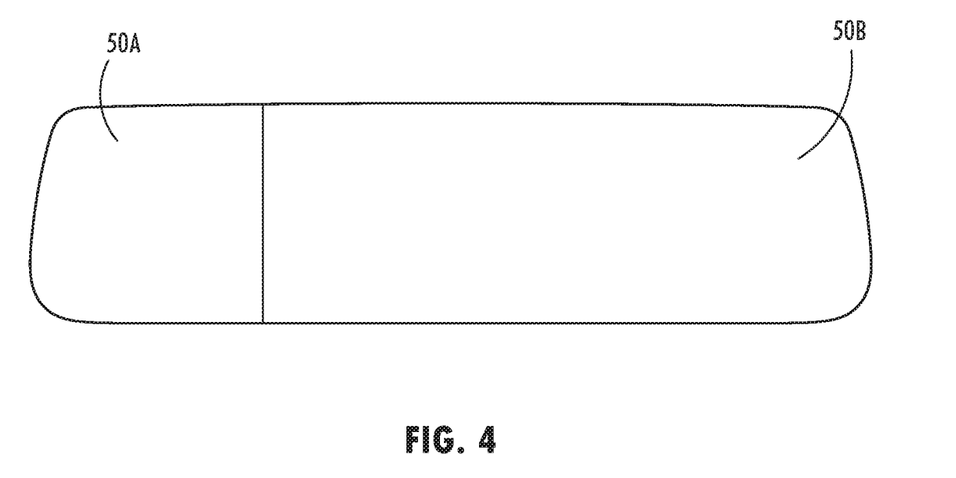
FIG. 4 illustrates a first embodiment of a display element of the rearview assembly of FIG. 1.
Figure 5:
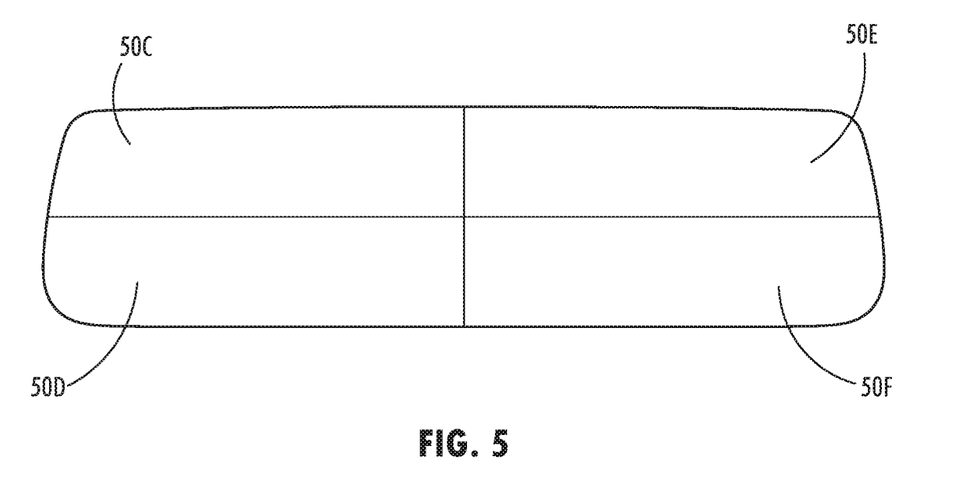
FIG. 5 illustrates a second embodiment of a display element of the rearview assembly of FIG. 1.

In some embodiments, display element 45 may be divisible into sections 50. Display element may be divided into, for example, two sections 50A, 50B as shown in FIG. 4 or quadrants 50C-50F as shown in FIG. 5, and different displays may appear in each of the different sections. The different displays may originate from different cameras or imaging devices. For example, a right side or section of display element 45 may display a view to the rear of the vehicle, and this display may originate in a camera or other imaging device 55 disposed to capture the view to the rear of the vehicle. Meanwhile a left side of display element 45 may display, for example, a view of a driver or a passenger in the vehicle, generated by camera or other imaging device 55 in the interior of the vehicle aimed at the occupants' seating positions within the interior of the vehicle. In some embodiments, imaging device 55 may be positioned to allow the vehicle driver to monitor an infant or child in a rear seat of the vehicle, especially an infant in a rear-facing seat. In some embodiments, imaging device 55 may be positioned to show the passenger compartment of the vehicle, or individual positions in the passenger compartment of the vehicle.

When display element 45 is divided into different sections, the different sections need not be of equal size. For example, one side 50b of the display 45 may display a view to the rear of the vehicle, and may utilize a majority of the width of the display element, while a second side 50a of display 45 may show a view of a person the driver is having a phone conversation with, and may utilize the remainder of the width of the display element. In some embodiments, display element 45 may be divisible into more than two sections. It will be appreciated by those skilled in the art that various other display configurations and numbers of sections may be displayed on display element 45.

In some embodiments, one side or one section of the display element may display an image received from a source outside the vehicle, such as through a cell phone or via WiFi, thereby allowing the user to make or participate in a video or conference call. In some embodiments, the images may include a live image of another party in a cell phone or VoIP conversation. The rearview assembly may be able to access a variety of communication protocols and systems such as video calls, video conference calls, shared computer screen applications, and social video chatting. These may include but are not limited to Skype®, FaceTime®, GoToMeeting, WebEx, and Google Hangouts®. In a conference call with several participants, it may be possible to display images of all or of a plurality of the participants on the display element 45, with each participant in a separate section on the display element. In some embodiments, the images may be from an application that allows users to share computer screens.

In some embodiments, displayed images may be from a networked security or surveillance system, such as a web cam at a daycare center or pet boarding facility, or a web-enabled home security system.

In some embodiments, imaging device 55 may have a wide field of view to allow the capture of multiple passengers in the vehicle. In some embodiments, a plurality of cameras or other imaging devices 55 are associated with rearview assembly 10, and each imaging device may be aimed at a different passenger position within the vehicle. In some embodiments, imaging devices 55 and microphone 80 may be in communication with a printed circuit board 60. Microphone 80 may be configured to determine the location of a source of speech. Different imaging devices may then be activated depending on the location within the vehicle of the speaker 92, and the imaging device being used may change as different passengers speak, thus providing video of different people at different times. In some embodiments, all or a plurality of passengers may be captured by different cameras or other imaging devices 55, to provide video feed to the external participants in the conversation. In some embodiments, different imaging devices 55 may be activated based upon receipt of a user input through a graphical user interface (GUI) 100.

Antenna 70 may be used for a cellular telephone system, an audio and data transmitting/receiving system, WiFi communications, a remote keyless entry (RKE) system, a trainable garage door opener system, a tire pressure monitoring system, a global positioning satellite system, a LORAN system, etc. Some of these systems may share a common antenna and receiving, transmitting, processing, and display circuits where appropriate. Appropriate receiving, transmitting, and/or processing circuitry may be included in or attached to the rearview assembly. Antenna 70 may further be in communication with a wireless RF transceiver (not shown). RF transceiver may have both audio and data channels, and data channels may include video capabilities. Such an audio/data transceiver may transmit and receive data over the interact via WiFi. It is anticipated that audio and video may be transmitted using Bluetooth™.

Antennas 70 and 75 may be mounted in the rearview assembly or may be mounted elsewhere in the vehicle. For example, the antennas may be mounted in a shark fin on the exterior of the car, or may be mounted in or on a headliner, a dashboard, or a window. Examples of such a construction are disclosed in commonly assigned U.S. Patent Application Publication No. US 2002/0032510 A1. Antennas may allow communication between the rearview assembly 10 and a user's cell phone. Antennas 70 and 75 may also serve to connect rearview assembly to the interact to allow users to make and receive audio and video phone calls through rearview assembly.

Optional second antenna 75 may be a microwave antenna, and may also be integrated with antenna 70 for use with a satellite radio or satellite phone.

In some embodiments, a SIM card may be disposed behind the display element and in communication with at least one of antennas 70, 75 to allow connection to a wireless or mobile phone network and to authenticate the user. A slot 65 defined by housing 30 may allow for easy insertion of the SIM card. In some embodiments, the SIM card may be for the same account that a user uses for a cell phone. Thus, the presence of a SIM card in housing 30 may allow the rearview assembly to function using the same phone number and account information as the user's cellular telephone account. In some embodiments, the SIM card may be for a different account than the account that a user uses for a cell phone. The SIM card may then allow the rearview assembly to function using a separate phone number and account from the number and account associated with the user's cell phone.

In some embodiments, an application or "app" on a user's cellular telephone 95 may allow the user's phone to make and receive calls, including video and video conference calls, through the rearview assembly. In this case, the call may be made through the user's wireless account. The app may allow users to initiate a video or conference call on the cell phone 95 in the traditional manner, then seamlessly transfer the call to the rearview assembly once a certain event, such as a second person joining the call, has taken place, or upon instructions from the user. Once the call has been transferred to the rearview assembly 10, display element 45 may display a video feed of the other participants in the call. In some embodiments, video feed may be obtained through WiFi. Camera or other imaging device 55 in the rearview assembly 10 may obtain video of the user, and may display that video on display element 45 and/or transmit it to other participants in the call. The app may also allow users to join a video or conference call on cell phone 95 in the traditional manner, then transfer the call to the rearview assembly, either once a certain event, such as the passage of a predetermined time interval, has taken place or once the user initiates the transfer.

The app may also allow a user to initiate a call directly from the rearview assembly. The GUI 100 may appear on the surface of the rearview assembly configured to be facing the driver of the vehicle. In some embodiments, the GUI 100 may appear whenever there is power to the rearview assembly. In some embodiments, the GUI may appear only at certain times, such as when there is an incoming call. In some embodiments, the GUI 100 may have at least one capacitive touch sensor 104 disposed on display element 45. Users can touch the surface of the rearview assembly 10 to initiate or answer a call, adjust volume of a call, or terminate a call. In some embodiments, rearview assembly 10 may include at least one button 106 for controlling various telephones functions. In some embodiments, these buttons may change function depending upon the particular mode of operation currently being performed by the rearview assembly. For example, buttons 106 may allow a user to turn the system on, place a call, or terminate a call in progress. These same buttons may be used for other functions when a call is not in progress.

In some embodiments, the vehicle may have a docking station for a cell phone, and the docking station may be in communication with the communication system and rearview assembly 10. This may allow users to make video or conference calls with the video display appearing in the display element 45 of the rearview assembly 10. The audio and video may be transmitted through the user's cell phone network, and may use the cell phone's microphone and speakers, or it may be transmitted through the rearview assembly 10 and may use microphone 80 and speakers 92 associated with the rearview device.

In some embodiments, cell phone 95 may be in communication with the vehicle through an auxiliary or aux cord, and the aux cord jack may be in communication with the rearview assembly, thereby allowing a user to make video and conference calls through the cell phone network. As discussed above, the audio and video may be transmitted through the user's cell phone network. The video may appear on display element 45 of rearview assembly 10. The audio may be transmitted through the cell phone's microphone and speakers, or it may be transmitted through rearview assembly 10 and may use the microphone 80 and speakers 92 associated with the rearview device.

In some embodiments, the communication system may be configured to allow a user to log in to the rearview assembly 10 to access the phone functionality, thereby preventing unauthorized users from accessing the phone capabilities. In some embodiments, the user may log in to the communication system through biometric identification such as, for example, iris scanning. The user may look into or place an eye in front of imaging device 55 for authentication. Rearview assembly 10 may further comprise a processor and memory. The image of the user's iris may be compared to previously stored images of the user's iris and, if they match sufficiently, the user may be allowed access to the communication system.

In some embodiments, the rearview assembly 10 may use a speech-recognition protocol to take transcript of a meeting or a call through voice recognition. A copy of the transcript may be forwarded to selected participants at the termination of a call, or the transcript may be archived and produced upon a user's request.

In some embodiments, microphone 80 may be able to detect the location from which a voice originates, and may be able to move to aim toward the person speaking. In an embodiment, imaging device 55 may be in communication with microphone 80, and may be able to move or rotate to aim toward the person speaking when microphone 80 detects the person's location. In an embodiment, microphone 80 and imaging device 55 are linked and move together.

In some embodiments, the calling capabilities of the rearview assembly 10 are disabled when the driver is controlling the car such as when the car is not driving autonomously. The system may be activated by, for example, placing the car in park or in an autonomous driving mode.

Rearview assembly 10 may be in communication with a GPS system, and rearview assembly may transmit information about local businesses or amenities to users upon a user's request. For example, a user could ask the rearview assembly 10 to display information such as location and prices about nearby gas stations or restaurants.

Figure 6:
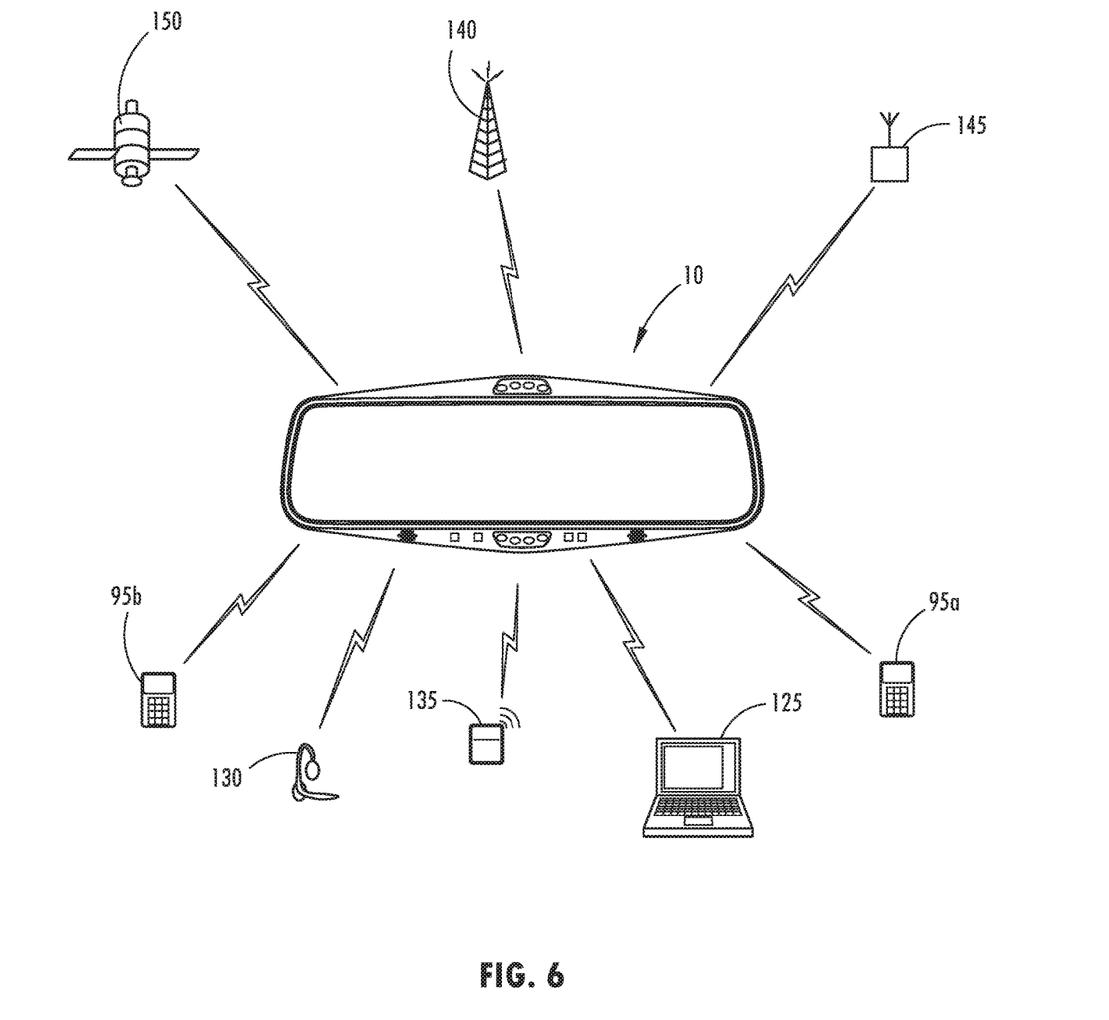
FIG. 6 illustrates a network of devices that may be connected directly or indirectly to the rearview assembly of this disclosure.

FIG. 6 illustrates a rearview assembly 10 and the various devices with which the rearview assembly may share a wireless connection. Some of the other devices that may be located in the vehicle may include a first cell phone 95*a*, a second cell phone 95*b*, a portable laptop, notebook computer or tablet 125, a headset 130, and a GPS unit 135. Other devices outside the vehicle that may be wirelessly connected to the circuitry in rearview assembly 10 include cellular telephone towers 140, wireless access ports 145 such as those exhibiting the "WiFi" 802.11a, b, g standards, and GPS or communication satellites 150. Other remote devices employing audio and data transceivers may also be connected wirelessly to the rearview assembly 10. The wireless connections to the rearview assembly circuitry may be via infrared, Bluetooth™, WiFi, satellite, microwave, any of the conventional cellular telephone protocols, or various combinations thereof. To allow all of these forms of communications to be performed with and through the rearview assembly 10, the rearview assembly may be equipped with the appropriate transceiver circuitry and antennae.

The present system has been described as speakers, microphones, imaging devices, and video displays, antennas, and related components associated with rearview assembly 10. In some embodiments, various other vehicle accessories and components may be incorporated in the rearview assembly in whole or in part and in various combinations. Such vehicle accessories and components may be mounted within, on or to the housing, the rearview assembly mount, an attachment to the rearview assembly mount or housing, or in a console or other housing associated with the rearview assembly. Additionally, any such vehicle accessories may share components with one another, such as processors, sensors, power supplies, communication lines/channels, wire harnesses and plugs, displays, switches, antennae, etc.

Figure 7:
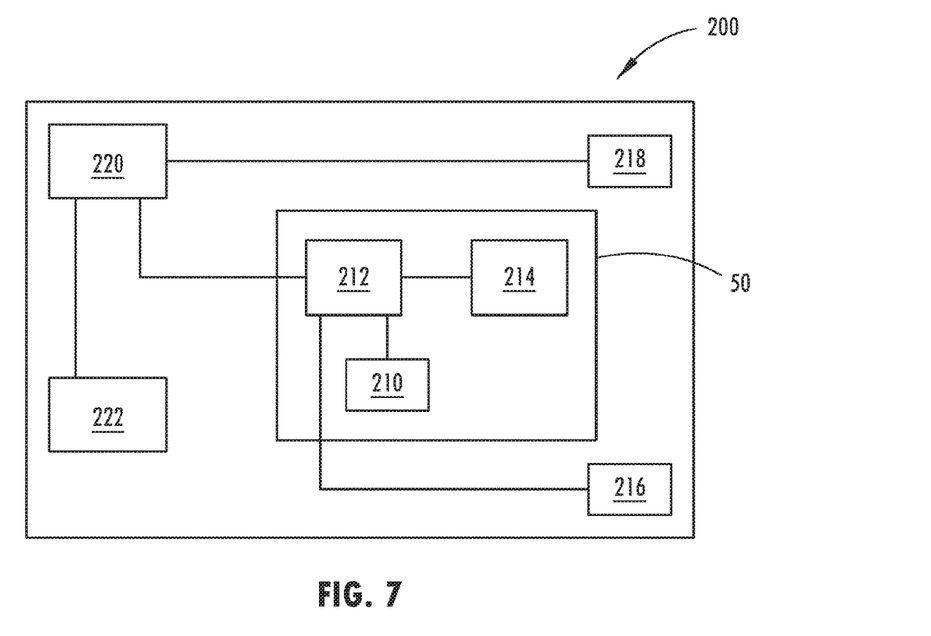
FIG. 7 illustrates a schematic representation of a dual-purpose imaging system in accordance with this disclosure.

In some embodiments, the imaging system may be configured as a dual-purpose imaging system 200, as shown in FIG. 7. Dual-purpose imaging system. 200 may be configured to capture images of a user for use both in video-calling or video-conferencing and for driver monitoring. Dual-purpose imaging system 200 may comprise a camera or imaging device 55. In some embodiments, imaging device 55 may comprise a lens 210, an image sensor 212 in optical communication with lens 210, and a processor 214 having memory. Image sensor 212 may be in communication with processor 214. Image sensor 212 may be configured to acquire one or more images of an occupant of the vehicle. Image sensor 212 may be configured to capture images selectively using visible and infrared or near-infrared light. In some embodiments, image sensor 212 may generate image data corresponding to the one or more acquired images. Imaging device 55 may be concealed within housing 30 of rearview assembly 10 such that rearview assembly 10 maintains an appearance of a conventional rearview mirror assembly.

In some embodiments, dual-purpose imaging system 200 may be disposed in rearview assembly 10 of the vehicle. Lens 210 may be positioned to allow it to have a field of view of and to capture images of an occupant of the vehicle. In some embodiments, lens 210 may be disposed between a housing 30 and one of a display surface and a reflective surface of display element 45. In some embodiments, lens 210 may be disposed in or on housing 30 of rearview assembly 10, or in a bezel (not shown) of housing 30. In some embodiments, dual-purpose imaging system may have a plurality of lenses 210. One lens may be positioned to have a field of view including a view of at least a portion of the driver of the vehicle such as the head or the face of the driver, and an additional lens or lenses may be disposed to have a field of view that allows the capture of images of other occupants of the vehicle.

In some embodiments, dual-purpose imaging system 200 may operate in either a driver monitoring mode during which dual-purpose imaging system 200 monitors the driver of the vehicle, and a video-calling mode in which dual-purpose imaging system 200 captures images of a driver or passenger for video- or conference-calling. Dual-purpose imaging system 200 may be configured to alternate between the driver monitoring mode and the video-calling mode based on inputs received by dual-purpose imaging system 200.

During the video-calling mode, image sensor 212 may capture images for purposes of video- or conference-calling. The images collected by dual-purpose imaging system 200 during the video calling mode may be displayed on display element 45 of rearview assembly 10. In some circumstances, ambient lighting may provide sufficient light to allow the capture of images without additional light. In some embodiments, especially in situations in which there is insufficient ambient visible light to allow image sensor 212 to capture an image of the user, an additional light source 218 may be disposed to provide additional visible light, selectively illuminating the face of the user, thereby allowing imaging device 55 to capture an image of the user. In some embodiments, additional light source 218 may be activated only during video-calling mode and only when either there is insufficient ambient light to capture an image of the user's face or shadows interfere with the capture of images of the user's face.

Figure 8:
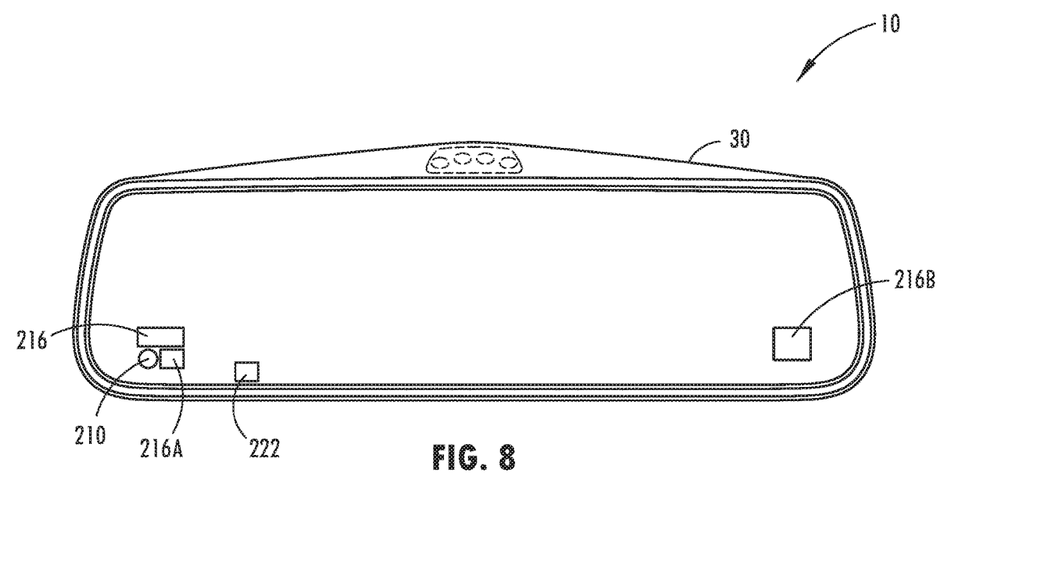
FIG. 8 illustrates a front view of a rearview assembly in accordance with an embodiment of this disclosure.

In some embodiments, additional light source 218 may be triggered by a light sensor 222, as shown in FIG. 8. In some embodiments, additional light source 218 may be triggered by imaging device 55 detecting low light values in the captured image.

In some embodiments, dual-purpose imaging system 200 may further comprise a controller 220 in communication with processor 214. In some embodiments, controller 220 may be in communication with at least one of light sensor 222 and image sensor 212, and may be configured to activate additional light source 218 upon receipt of certain inputs from at least one of light sensor 222 and image sensor 212. The certain inputs may include indications that there is insufficient ambient light for collecting images for video calling. Upon activation, additional light source 218 may project additional light onto the user.

When dual-purpose imaging system 200 is operating in a driver monitoring mode, it may capture images of the driver of the vehicle either intermittently or continually. Dual-purpose imaging system 200 may monitor and capture images of at least one of predefined facial, head, and body characteristics or positions of the driver. In some embodiments, the captured images may include but are not limited to: the position and movements of the pupils of the driver's eye(s), frequency and duration of blinking, position of eyelids, head position and orientation, head movement, pulse rate, facial and eye movements, or other suitable driver performance indicators.

In some embodiments, processor 214 may process the captured images to generate image data on driver characteristics. The generated image data may include, for example, blink rate, blink duration, head position and orientation, eye position, pulse rate, or other suitable driver performance indicators.

In some embodiments, processor 214 may compare the generated image data from the images captured during the driver monitoring mode with predetermined parameters for the selected driver characteristics. In some embodiments, processor 214 may contain predetermined thresholds for allowable deviations between the captured images and the predetermined parameters. After comparing the generated image data with the predetermined parameters, processor 214 may determine whether the driver is exhibiting any signs that may indicate impairment.

In some embodiments, processor 214 may compare the images or the image data generated from the images captured during the driver monitoring mode with previously captured images or with image data generated from previously captured images. In some embodiments, the previously captured images used for comparison may include images captured at the beginning or during the first several minutes of a drive. A driver may be less likely to be fatigued or distracted during the first several moments of a drive than after driving for a period of time. The previously captured images may be stored in the memory of processor 214 of dual-purpose imaging system 200. In some embodiments, processor 214 may contain predetermined thresholds for allowable deviations between the captured images and the stored images or the stored image data. After comparing, processor 214 may determine whether the driver is exhibiting any signs that the driver may be impaired.

In some embodiments, dual-purpose imaging system 200 may comprise an infrared (IR) light emitter 210. In some embodiments, IR emitter 216 may be disposed in rearview assembly 10 of the vehicle. In some embodiments, IR emitter 216 may be disposed between a surface of display element 45 and rear housing 30 of rearview assembly 10. In some embodiments, IR emitter 216 may be disposed to allow it to emit light through an opening in an exterior surface of housing 30.

In some embodiments, it may be desired to co-locate IR emitter 216 and lens 210. Co-locating IR emitter 216 and lens 210 may promote over-bright pupils in captured images. This may allow image sensor 212 to be better able to capture the pupil position. Thus, in some embodiments, IR emitter 216 may be disposed adjacent to, either above, below, or beside, lens 210.

In some embodiments IR emitter 216 may be disposed in one of the dashboard, the steering wheel, the headliner, an overhead console, or an infotainment console of the vehicle. Positioning IR emitter 216 in a spaced apart relationship from lens 210 may reduce or eliminate the occurrence of over-bright pupils in captured images.

In some embodiments, dual-purpose imaging system 200 may comprise a plurality of IR emitters 216, and the plurality of IR emitters 216 may comprise at least one primary IR emitter 216A and at least one secondary IR emitter 216B. In some embodiments, the at least one primary IR emitter 216A may be located apart from the at least one secondary IR emitter 216B. For example, primary IR emitter 216A may be disposed in rearview assembly 10 in proximity to lens 210, and secondary IR emitter 216B may be disposed apart from primary a emitter 216A, either within rearview assembly 10 but spaced apart from primary IR emitter 216A or in a separate component of the vehicle such as the overhead console, the dashboard, or the infotainment console. In some embodiments, controller 220 may be in communication with secondary IR emitter 216B, and may cause the activation of secondary IR emitter 216B upon receiving inputs that indicate the secondary light may be desirable.

IR emitter 210 may comprise at least one IR or near-IR (NIR) light source. In some embodiments, IR emitter 216 may comprise at least one IR light-emitting diode (LED). IR emitter 216 may selectively provide light in wavelengths of between about 750 and 950 nm. In some embodiments, IR emitter 216 may selectively provide light in wavelengths of about 940 nm. In some embodiments, IR emitter 216 may be configured to selectively direct IR illumination in the direction of the field of view of lens 210. IR emitter 216 may be disposed to selectively illuminate the face of the driver of a vehicle with IR light. IR emitter 216 may selectively emit steady IR light or pulsed IR light.

When operating in driver monitoring mode, IR emitter 216 may allow imaging device 55 to capture images that could not be captured by relying solely on visible light such as, for example, when there is insufficient ambient lighting for image capture. IR or NIR light from IR emitter 216 may provide more consistent lighting conditions for image capture than ambient visible light. Furthermore, IR or NIR light is not visible to the driver, thereby allowing the illumination of the driver's face without the driver being aware of or disturbed by the light. When IR emitter produces sufficient IR or NIR light, images captured by image sensor 212 may not be affected by changes in ambient visible light.

In some embodiments, dual-purpose imaging system 200 may comprise at least one filter (not shown). In some embodiments, the at least one filter of dual-purpose imaging system 200 may be configured to block or to allow certain wavelengths of light to reach image sensor 212. The at least one filter may be a static filter or a dynamic filter. In some embodiments, dual-purpose imaging system 200 may comprise both a first filter and a second filter. In some embodiments, one of first and second filters may be a static filter, and one of first and second filters may be a dynamic filter. In some embodiments, rearview assembly 10 may comprise a first filter and dual-purpose imaging system 200 may comprise a second filter.

In some embodiments, a dynamic filter may be configured to block IR light from entering dual-purpose imaging system 200 when the user is conducting a conference or video call or otherwise using the video function of the image sensor 212. Blocking IR light when using the video function may reduce or eliminate unwanted visual effects from the image.

In some embodiments, a dynamic filter may be configured to block visible light when dual-purpose imaging system 200 is operating in driver monitoring mode. The blocking of visible light may reduce visual contamination and noise when monitoring a driver during daytime usage or when ambient light interferes with the quality of the image. In some embodiments, IR emitter 216 may be configured to provide a sufficient amount of IR light to reduce the detrimental effect of any visible light present, thereby reducing or eliminating the impact of any ambient visible light and preventing the visible light from interfering with the IR-based images.

In some embodiments, a dynamic filter may be configured to block IR light when the video calling capabilities of dual-purpose imaging system 200 are being used, and to block visible light from image sensor 212 when dual-purpose imaging system 200 is operating in a driver monitoring mode.

In some embodiments, a dynamic filter may default to blocking visible light and allowing the capture of images using IR light. When triggered by a user input such as the initiation of a video call, the dynamic filter may be configured to operate as a color filter, capturing images using visible light. Upon termination of the call or the receipt of another predetermined system or user input, the dynamic filter may return to blocking visible light and allowing the passage of IR light.

In some embodiments, image sensor 212 may have a color filter array comprising an IR or near-IR filter in the filter pattern such as an RGB-IR color filter or an RGB-near-IR (RGBN) color filter. The RGB-IR or RGBN color filter may obtain information from both the visible and the IR spectrum simultaneously. This may allow image sensor 212 to capture images using visible light during the day or any time there are sufficient sources of visible light. It would also allow image sensor 212 to capture images when the light is partially or primarily from IR sources. In some embodiments, an RGB-IR or RGBN color filter may be used in conjunction with an IR emitter 216. IR emitter 216 may be used to overwhelm the visible light during the driver monitoring mode, thereby providing uniform IR lighting in a sufficient amount for the capture of the desired images.

In some embodiments, image sensor 212 may employ a global shutter (not shown). A global shutter may provide superior performance in the driver monitoring mode, especially in bright sun conditions. IR emitter 216 may be in communication with the global shutter, and IR emitter 216 may pulse IR light in concert with the opening of the shutter, so that each time the shutter opens, IR emitter 216 emits a pulse of IR light. The light from IR emitter 216 may reduce interference from ambient visible light and improve image quality.

In some embodiments, dual-purpose imaging system 200 may be in communication with vehicle speaker, or with a cell phone speaker or a dedicated speaker in the vehicle (not shown). Upon determining that a driver is distracted or fatigued, dual-purpose imaging system 200 may trigger speaker, cell phone speaker or dedicated speaker to produce an audible signal to alert the driver. In some embodiments, dual-purpose imaging system 200 may be in communication with other vehicle systems that, upon receipt of an indication that a driver is fatigued, may intervene to reduce the likelihood of an accident by, for example, taking over navigation of the vehicle and parking it in a safe location away from traffic.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It should be noted that references to "front," "back," "rear," "upward," "downward," "inner," "outer," "right," and "left" in this description are merely used to identify the various elements as they are oriented in the FIGURES. These terms are not meant to limit the element which the describe, as the various elements may be oriented differently in various applications.

The invention claimed is:

1. A system for a vehicle comprising:
a rearview assembly comprising a display element configured to selectively provide a rearward view of a scene behind the vehicle;
at least one imaging device having a field of view and in communication with the display element, the imaging device configured to:
capture images of an occupant of a driver's seat of the vehicle for driver monitoring purposes while the system is operating in a first mode; and
capture images from within a passenger compartment of the vehicle for selective transmission to other users external to the vehicle while the system is operating in a second mode;
a first filter configured to selectively block light in the visible portion of the spectrum when the system is operating in the first mode;
a second filter configured to selectively block light in the infrared portion of the spectrum when the system is operating in the second mode; and
a printed circuit board in communication with the display element and the at least one imaging device;
wherein the display element is configured to selectively display content received from a source external to the vehicle;
wherein the display element is suitable for receiving inputs from a plurality of sources;
wherein the rearview assembly is configured to allow a user to selectively use the rearview assembly to participate in a video call by causing images to be captured by the at least one imaging device, causing the captured images to be transmitted to at least one other participant in the video call, receiving live images from a source external to the vehicle, and displaying the received live images; and
wherein the plurality of sources includes at least one of the internet and a cellular network and the content to be displayed comprises live images of at least one party in a video phone call.

2. The system of claim 1, further comprising at least one microphone disposed within a housing of the rearview assembly and in communication with the printed circuit board.

3. The system of claim 1, further comprising at least one speaker disposed within a housing of the rearview assembly and in communication with the printed circuit board.

4. The system of claim 1, further comprising at least one antenna in communication with the printed circuit board and configured to be in selective communication with one of a cellular telephone network and the internet.

5. The system of claim 4, further comprising a SIM card; wherein a housing of the rearview assembly defines a slot for a SIM card; and wherein the SIM card is configured to be in communication with the at least one antenna.

6. The system of claim 1, further comprising at least one capacitive touch sensor in communication with the printed circuit board and disposed on a surface of the display element.

7. The system of claim 1, wherein the display element is capable of displaying images received from different sources in different sections of the display element; and wherein at least one of the inputs is received from one of the internet and a cellular network.

8. The system of claim 1, further comprising an electro-optic device disposed so that the display element is viewed through the electro-optic device.

9. An assembly for a vehicle, comprising:
a rearview assembly configured to selectively provide a rearward view of a scene behind the vehicle and comprising a display element;
a printed circuit board in communication with the display element;
at least one imaging device having a field of view and in communication with the display element, the imaging device configured to:
capture images of an occupant of a driver's seat of the vehicle for purposes of driver monitoring while the assembly is operating in a first mode; and
capture images from within a passenger compartment of the vehicle for selective transmission to other users external to the vehicle while the assembly is operating in a second mode;

a first filter configured to selectively block light in the visible portion of the spectrum when the assembly is operating in the first mode;

a second filter configured to selectively block light in the infrared portion of the spectrum when the assembly is operating in the second mode; and an antenna in communication with the printed circuit board and configured to communicate with at least one of the internet and a cellular network;

wherein the rearview assembly is configured to allow a user to selectively use the rearview assembly to participate in a video call by causing images to be captured by the at least one imaging device and by causing the captured images to be transmitted to at least one other party in the video call;

wherein the display element is configured to selectively display content received from at least one of a plurality of different sources; and wherein the plurality of different sources includes at least one of the internet and a cellular network and the content to be displayed comprises live images of at least one party in a video phone call.

10. The assembly of claim 9, wherein the display element is configured to selectively display content from a plurality of sources; and wherein the content from each of the plurality of sources is displayed in a different section of the display element.

11. The rearview assembly of claim 9, further comprising at least one microphone in communication with the printed circuit board; wherein the at least one microphone is configured to capture audio from within the vehicle.

12. The rearview assembly of claim 9, further comprising at least one speaker in communication with the printed circuit board.

13. The rearview assembly of claim 9, further comprising at least one antenna in communication with the printed circuit board; wherein the antenna is configured to be in selective communication with one of a cellular telephone network and the internet.

14. The rearview assembly of claim 9, further comprising a SIM card; wherein a housing of the rearview assembly defines a slot for a SIM card; wherein the SIM card is disposed in the slot defined by the housing; and wherein the SIM card is in communication with the at least one antenna.

15. The rearview assembly of claim 9, wherein the display element is configured to receive inputs from a plurality of sources; and wherein the display element is capable of displaying the inputs from each of the plurality of sources in different sections of the display element.

16. A dual-purpose imaging system comprising:
an imaging device disposed within a vehicle comprising:
  a lens;
  an image sensor in optical communication with the lens and configured to selectively capture images of one or more occupants of the vehicle using one of visible and infrared or near-infrared light;
  a processor in communication with the image sensor and configured to:
    when the dual-purpose imaging system is in a first mode, process captured images of an occupant of the vehicle in order to generate image data on particular driver characteristics, to compare the generated image data with one of predetermined parameters and previously captured images of the occupant, and to determine whether the occupant is exhibiting signs of impairment; and
    when the dual-purpose imaging system is in a second mode and being used in a video call, cause the captured images to be transmitted to at least one other party in the video call, the at least one other party located external to the vehicle;
  a first filter;
  a second filter;
  at least one IR emitter configured to selectively direct one of IR and NIR illumination in the direction of the field of view of the lens when the dual-purpose imaging system is operating in the first mode; and
  a visible light source configured to selectively emit visible light in the direction of the field of view of the lens when the dual-purpose imaging system is operating in the second mode;
wherein the first filter is configured to selectively reduce light having wavelengths within a first range of wavelengths from reaching the image sensor; and
wherein the second filter is configured to selectively reduce the amount of light having wavelengths within a second range of wavelengths from reaching the image sensor;
wherein at least one of the first and second filters is a dynamic filter configured to block IR light when the dual-purpose imaging system is operating in the second mode.

* * * * *